United States Patent
Reisel et al.

(10) Patent No.: US 9,624,995 B2
(45) Date of Patent: Apr. 18, 2017

(54) TUNGSTEN-CARBIDE-BASED SPRAY POWDER, AND A SUBSTRATE WITH A TUNGSTEN-CARBIDE-BASED THERMALLY SPRAYED LAYER

(75) Inventors: Guido Reisel, Schweina (DE); Manfred Oechsle, Hochheim am Main (DE)

(73) Assignee: OERLIKON METCO WOKA GMBH, Barchfeld (DE)

( * ) Notice: Subject to any disclaimer, the term of this patent is extended or adjusted under 35 U.S.C. 154(b) by 0 days.

(21) Appl. No.: 14/124,880

(22) PCT Filed: May 31, 2012

(86) PCT No.: PCT/EP2012/060300
§ 371 (c)(1),
(2), (4) Date: Apr. 7, 2014

(87) PCT Pub. No.: WO2012/168139
PCT Pub. Date: Dec. 13, 2012

(65) Prior Publication Data
US 2014/0234609 A1    Aug. 21, 2014

(30) Foreign Application Priority Data

Jun. 10, 2011 (WO) ................. PCT/EP2011/059740

(51) Int. Cl.
| | |
|---|---|
| *F16D 69/02* | (2006.01) |
| *C22C 29/08* | (2006.01) |
| *C23C 4/10* | (2016.01) |
| *F16D 65/12* | (2006.01) |
| *C22C 1/10* | (2006.01) |
| *C23C 24/04* | (2006.01) |

(52) U.S. Cl.
CPC ............ *F16D 69/02* (2013.01); *C22C 1/1026* (2013.01); *C22C 29/08* (2013.01); *C23C 4/10* (2013.01); *C23C 24/04* (2013.01); *F16D 65/12* (2013.01); *F16D 65/127* (2013.01); *B22F 2998/10* (2013.01); *F16D 2250/0046* (2013.01); *Y10T 428/24997* (2015.04); *Y10T 428/2982* (2015.01)

(58) Field of Classification Search
CPC .................................................... C22C 29/08
USPC ........................................................ 75/252
See application file for complete search history.

(56) References Cited

U.S. PATENT DOCUMENTS

| | | |
|---|---|---|
| 3,848,313 A | 11/1974 | Guyonnet |
| 5,346,316 A | 9/1994 | Okada |
| 5,458,460 A | 10/1995 | Okada et al. |
| 5,839,880 A | 11/1998 | Okada et al. |
| 6,482,534 B2 | 11/2002 | Itsukaichi |
| 2001/0019742 A1 | 9/2001 | Itsukaichi et al. |
| 2002/0136894 A1* | 9/2002 | Itsukaichi et al. ............ 428/402 |
| 2011/0278116 A1 | 11/2011 | Lembach |
| 2011/0293849 A1 | 12/2011 | Lembach et al. |

FOREIGN PATENT DOCUMENTS

| | | |
|---|---|---|
| CN | 1309106 | 8/2001 |
| DE | 43 21 713 | 6/1993 |
| DE | 10 2009 008 114 | 8/2010 |
| EP | 0 561 391 | 3/1982 |
| EP | 1 126 043 A1 | 8/2001 |
| GB | 1 385 479 A | 2/1975 |
| JP | 3-86306 | 4/1991 |
| JP | 9-143668 | 6/1993 |
| JP | 2001-3152 | 1/2001 |
| JP | 2001-234320 | 8/2001 |
| JP | 2003-35090 | 2/2003 |
| JP | 2004-3325 | 1/2004 |
| JP | 2004-300528 | 10/2004 |
| JP | 2011-31247 | 2/2011 |
| WO | 2010/089047 | 8/2010 |

OTHER PUBLICATIONS

Int'l Search Report from Int'l Patent Appl. No. PCT/EP2012/060300 (Sep. 13, 2012).
Chinese Office Action (with English language translation) dated Mar. 27, 2015 and issued in Chinese application No. 201280027356.
Japanese Office Action (with English language translation) dated Feb. 19, 2016 and issued in JP Application No. 2014-514000.
Japanese Office Action (with English language translation) dated Jul. 22, 2016 and issued in JP Application No. 2014-514000.
EP Office Action issued in EP 12727134.7 dated Jan. 30, 2017.

* cited by examiner

*Primary Examiner* — Jessee Roe
*Assistant Examiner* — Christopher Kessler
(74) *Attorney, Agent, or Firm* — Greenblum & Bernstein, P.L.C.

(57) ABSTRACT

The invention relates to a thermal spray powder on a tungsten carbide basis, as well as to a method for the manufacture of such a spray powder for the thermal coating of a substrate, in particular for the thermal coating of a brake disc for a vehicle. In accordance with the invention, the spray powder includes, apart from impurities, WC in the range of 60% to 75% by weight, $Cr_3C_2$ in the range of 14% to 22% by weight and Ni in the range of 11% to 23% by weight. The invention further relates to a sub-strate, in particular for a brake disc having a thermal spray layer on a tungsten carbide basis, as well as to a method for the manufacture of a thermal spray layer on a substrate.

12 Claims, 1 Drawing Sheet

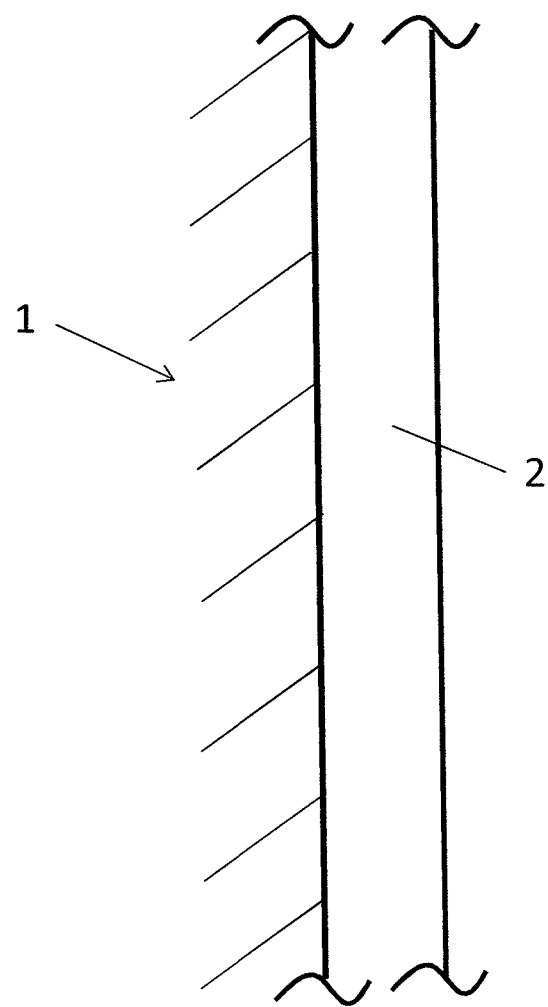

TUNGSTEN-CARBIDE-BASED SPRAY POWDER, AND A SUBSTRATE WITH A TUNGSTEN-CARBIDE-BASED THERMALLY SPRAYED LAYER

CROSS-REFERENCE TO RELATED APPLICATIONS

The present application is a U.S. National Stage of International Patent Application No. PCT/EP2012/060300 filed May 31, 2012 which published as WO/2012/168139 on Dec. 13, 2012, and claims priority of EP Patent Application No. PCT/EP2011/059740 filed Jun. 10, 2011.

BACKGROUND OF THE INVENTION

1. Field of the Invention

The invention relates to a spray powder on a tungsten carbide basis and to a method for the manufacture of such a spray powder for the thermal coating of a substrate, in particular for the thermal coating of a brake disc of a vehicle, as well as to a substrate, in particular a brake disc having a thermal spray layer on a tungsten carbide basis, and to a method for the manufacture of a thermal spray layer in accordance with the preamble of the independent claim of the respective category.

2. Discussion of Background Information

Coatings applied by thermal spraying have been known for a long time for a plurality of applications. Thus, for example, surfaces of cylinder running surfaces lubricated by oil in vehicle motors have been coated for a very long time, amongst other things, by plasma spraying, wherein the layer significantly reduces, in particular the coefficient of friction which is effective between the piston ring and the cylinder wall, such that the wear of the piston rings and the cylinders is significantly reduced which leads to an increase of the running performance of the motor, an increase of the period of the interval between maintenance, for example, an oil change, and not least to a significant increase in the performance of a motor.

Further typical applications of surfaces applied by thermal spraying are the coating of turbine parts with wear protective layers and thermal barrier layers of components of oil or dry lubricated bearings, such as the coating of crank bearings or other work pieces which are subjected to particular physical, chemical or thermal loads. Depending on the purpose the layer has to satisfy, very particular materials, generally in the form of spray powders or spray wires are used, which materials have the required specific properties and composition in order to generate the required properties of the surface layer to be sprayed.

A different application example is the provision of a friction surface at a surface which serves precisely the reverse purpose and should increase the friction between the substrate and a friction partner to be brought into contact with the substrate, with the substrate itself simultaneously being protected against wear and/or damage.

Thus, it is, for example, already known from the DE 43 21 713 A1 to provide brake discs for vehicles having a thermal spray layer, in order to, on the one hand, increase the braking effect on braking the vehicle and to, on the other hand, simultaneously protect the substrate, this means the brake disc, itself from direct wear and in this way to finally also increase the lifetime of the brake disc.

In this connection, the requirements on the braking systems, in particular in the automotive industry, and also in the e.g. aeronautical field have continuously increased. The braking systems must also controllably and reliably brake relatively heavy vehicles or aeroplanes, moreover at high speeds and at adverse conditions, such as aquaplaning. This represents high demands in effort and cost, not only with respect to e.g. the adhesive tensile strength of the friction coating at the braking disc, but also with respect to the physical parameters, such as the micro-hardness and the macro-hardness, the thermal stability of the properties of the friction layers etc. In this connection, the friction layers alone should be manufacturable relatively simply and if possible with established methods already for economic reasons and the materials used for the coating should have a simple structure in their chemical composition and should be able to be manufactured with comparatively little demand in effort and cost. Moreover, at the same time the friction layers should simultaneously have a long lifetime, this means, wear as little as possible during operation from a mechanical point of view and besides this also be sufficiently resistant with respect to the very high temperature developments on braking and also with respect to chemical attacks, such as e.g. be as resistant as possible with respect to corrosion, such that the long periods between maintenance and/or periods between replacement can be realized.

The solutions known from the state of the art in this connection can generally only optimize one specific or at most a few of the previously mentioned aspects, wherein a compromise has to be made with respect to the other properties.

In order to at least partly balance out the disadvantages, in part comparatively demanding coating methods having complicated layer systems have been suggested with respect to the brake discs. Thus, in the DE 10 2009 008 114 A1 a brake disc having a tungsten carbide based coating is suggested, wherein the tungsten carbide coating, applied by means of thermal spray method, has to be post-treated by means of carbonizing, oxidizing, gas nitro carbonizing or a different gas or plasma-based method.

The post-treatment in this connection is compulsory necessary in order to achieve a hardness of the friction area close to the surface in that a wear resistant and corrosion resistant hardened surface layer is formed through the diffusion of the atoms from the plasma and/or gas phase.

This method is naturally very demanding in effort and cost, since after the thermal coating of the brake discs a gas treatment method has to be switched downstream in a compulsory manner which unnecessarily complicates the manufacture and makes it expensive.

SUMMARY OF THE INVENTION

For this reason, it is the object of the invention to provide a thermal spray powder for the thermal coating of a substrate, by means of which, on the use of generally known thermal spray methods, thermal sprayed layers can be manufactured which can be particularly advantageously used as friction layers at brake discs, for example, of land or air vehicles of all kind and in which in this connection all essential demanding features of the layer are simultaneously optimized. In this connection, the manufacture should be significantly simplified in comparison to the state of the art and the number of the required method steps should be reduced to a minimum during the manufacture.

Furthermore, it is an object of the invention to provide a method for the manufacture of a corresponding spray powder, as well as a thermal spray method for the manufacture of corresponding thermal spray layers.

The subject matters of the invention satisfying this object are characterized by the features of the independent claims of the respective category.

The respective dependent claims relate to particularly advantageous embodiments of the invention.

BRIEF DESCRIPTION OF THE DRAWINGS

FIG. 1 illustrates a substrate on which a thermal coating has been applied in accordance with the invention.

DETAILED DESCRIPTION OF THE INVENTION

Thus, the invention relates to a spray powder on a tungsten carbide basis for the thermal coating 1 of a substrate 2 which spray powder includes, apart from impurities, WC in the range of 60% to 75% by weight, $Cr_3C_2$ in the range of 14% to 22% by weight, and Ni in the range of 11% to 23% by weight.

It is a significant realization of the invention that through the use of an increased nickel content in the spray powder which lies, for example, approximately between 11% and 23% by weight, e.g. a friction surface on a brake disc can be manufactured which without a pre-treatment, amongst other things also has a sufficient corrosion resistance and hardness. This is the decisive advantage with respect to spray powders, such as are known, e.g. from DE 10 2009 008 114 A1, on whose use, after the spraying of the friction layer, a post-treatment is compulsory necessary.

In a preferred embodiment in this connection the portion of WC in the spray powder lies in the range of 63% to 70% by weight, preferably at 67% by weight.

The portion of $Cr_3C_2$ in the spray powder is preferably selected in the range of 17% to 19% by weight, in particular at 18% by weight, with the portion of Ni in the spray powder preferably being selected in the range of 13% to 20% by weight, preferably at 15% by weight.

A nominal particle size of the spray powder in this connection preferably lies in the range of −45 µm to +11 µm, in particular in the range of −45 µm to +20 µm. Wherein the previously used nomenclature for the particle size is to be understood in the manner common to the person skilled in the art. Thus, e.g. as usual, for example, a particle size in range of −45 µm to +11 µm means that the particles are larger than 11 µm and smaller than 45 µm.

In this connection the spray powder in accordance with the invention can also include, apart from the mentioned technically significant chemical components tungsten carbide (WC), chrome carbide ($Cr_3C_2$) and nickel (Ni), as technically measurable impurities up to 0.5% by weight Fe impurities, and/or at most include the following chemical elements as impurities summarized by the abbreviation TAO (Total All Other): Na, Mg, Al, Si, K, Ca, Ti, V, Mn, Co, Cu, Zn, Ge, Rb, Sr, Y, Zr, Nb, Mo, Rh, Pd, Cd, In, Sn, Hf, Ta, Tl, Pb.

The overall portion of TAO in this connection likewise amounts to at most 0.5% by weight, such that in a spray powder in accordance with the invention in addition to the technically relevant chemical components tungsten carbide (WC), chrome carbide ($Cr_3C_2$) and nickel (Ni) at most 1% by weight, of actually undesired impurities can be included, namely at most 0.5% by weight Fe and a total of at most 0.5% impurities selected from the group of the elements which were defined above by the abbreviation TAO. It is understood that in the ideal case no impurities, this means neither Fe nor an element from the group of TAO is included in a spray powder in accordance with the invention which, however, can hardly be realized in practice.

In this connection, Fe can be present in the spray powder of the present invention, e.g. in particular between 0.05% and 0.5% by weight without having a technically significant influence on the invention of the properties of the layers sprayed with such a spray powder. As long as the content of Fe impurities is not larger than 0.5% by weight, in particular the required corrosion resistance of the layer sprayed with the spray powder can reliably be ensured. And also the remaining layer properties, such as e.g. porosity, micro-hardness and macro-hardness or also the adhesive tensile strength of the layers sprayed using the spray powders in accordance with the invention are practically not influenced by such a small Fe contamination and/or by the other impurities summarized as TAO.

For the mentioned, generally undesirable impurities, which can be present in a spray powder in accordance with the invention, there can be different causes which can frequently not be avoided using a justifiable technical demand in effort and cost which also do not have to be avoided for all practical purposes, since impurities in the above-mentioned size range, as already mentioned, practically have no influence on the technically relevant properties of a spray powder in accordance with the invention and/or a spray layer thermally sprayed in this way.

Cobalt (Co) can be present, for example with up to almost 0.5% by weight in practice up to 0.05%, 0.1% or between 0.1% and almost 0.5% by weight, since Co can e.g. be included in the hard metal balls beside WC by means of which metal balls the raw materials of the spray powder in accordance with the invention are grinded in a known manner on the manufacture of the spray powder. Also the raw materials used on the manufacture of the spray powder can include impurities in small measures, for example, tantalum (Ta). The impurities in this connection can both be introduced by the essential chemical raw materials tungsten carbide (WC), chrome carbide ($Cr_3C_2$) and nickel (Ni) during the manufacturing process or they can also be introduced e.g. by a binder, an antifoaming agent, by tools, process chambers etc. on the manufacture of the powder or be introduced in a different manner known to the person skilled in the art into the manufacturing process in an undesirable manner and in this way can finally contaminate the spray powder to an insignificant degree as described above.

In this connection the invention further relates to a method for the manufacture of a spray powder in accordance with the invention, which method includes the following method steps each independently known; provision of the primary carbides WC, $Cr_3C_2$ as well as Ni and manufacture of a powder mixture from the previously mentioned components which, apart from impurities, as already discussed above in detail, is only composed of WC in the range of 60% to 75% by weight, $Cr_3C_2$ in the range of 14% to 22% by weight and Ni in the range of 11% to 23% by weight. The standard particle size of the mentioned primary carbides, which can serve as a starting material for the manufacture of the spray powder in accordance with the invention, in this connection lies in the range of 0.5 µm to 4 µm, in particular at 2 µm to 3 µm particularly preferably at 2.5 µm, with naturally also all other primary carbides being advantageously used with particle sizes deviating therefrom.

In this connection it has been shown that small particle sizes of the primary carbides in the range of approximately 0.5 µm to 4 µm massively positively influence, in particular the abrasion behavior and in this way the wear behavior, in particular of brake discs. Such small primary carbide particles namely distribute themselves very uniformly and homogeneously in the sprayed layer and are simultaneously arranged very close to one another in the layer and for this reason form a dense distribution pattern of primary carbide particles in the layer. If in contrast to this, larger primary particles are used, e.g. having the same mass proportion, than these are less dense, less uniform and less homogeneously distributed in the layer which has the effect that, on a mechanical loading of the layer, for example, in the case of brake discs during the braking procedure, the spray layer can tend to the formation of corrugations, whereby a premature wear is favored. Moreover, it has been shown that the micro-hardness of the layers for small primary particle sizes can be significantly improved in comparison to layers which were sprayed with significantly larger primary carbides.

A suspension is then manufactured and the suspension is homogenized from the powder mixture, a liquid, in particular a solvent, such as, for example, iso-hexane or a different generally known solvent, and additionally preferably one or more additives, which for example can be a binder and/or an antifoaming agent and/or a different additive known to the person of ordinary skill in the art from the manufacture of powder.

From the homogenized suspension a powder cake, in particular an agglom-erate is made by spray drying, preferably on densifying the dried mixture and subsequent sintering of the preferably compressed mixture. The sintered powder cake is finally broken and/or ground to a powder material.

Depending on the specific application, the powder material is finally classified by a selection of a predefined seed size distribution by means of a classification method and can then be used for the intended application, e.g. for the thermal coating of a brake disc for a vehicle.

In the following table 1 a chemical composition of a particularly preferred embodiment of a spray powder in accordance with the invention is exemplary provided which has been proven to be excellent in tests. All percentage statements in this connection are percentage by weight.

TABLE 1

Chemical composition of a spray powder in accordance with the invention

| C | Ni | Cr | Co | Fe | W |
|---|---|---|---|---|---|
| 6.29% | 15.03% | 14.93% | 0.15% | 0.08% | rest |

In table 2 the seed size distribution of the spray powder in accordance with table 1 is provided in μm. In this connection, as common, for example "0.47% in the range of −63+53" means that 0.47% of the seeds of the classified powder are larger than 53 μm and smaller than 63 μm, this means that 0.47% of the seed size can lie in the range between 53 μm and 63 μm.

TABLE 2

Grain size distribution of the spray powder in accordance with table 1.

| μm | % by weight |
|---|---|
| +63 | 0.00 |
| −63 +53 | 0.47 |
| −53 +45 | 4.88 |
| −45 +20 | 81.61 |
| −20 | 13.04 |

The invention further relates to a substrate having a thermal spray layer on a tungsten carbide basis, wherein in accordance with the present invention the thermal spray layer includes, apart from impurities, WC in the range of 60% to 75% by weight, $Cr_3C_2$ in the range of 14% to 22% by weight and Ni in the range of 11% to 23% by weight. In this connection the substrate is preferably a brake disc for a vehicle, e.g. for a land or air vehicle, wherein the substrate can also be a different substrate which must be provided with a friction layer.

In this connection the spray layer of the substrate in accordance with the invention also includes, apart from the mentioned technically important chemical components tungsten carbide (WC), chrome carbide ($Cr_3C_2$) and nickel (Ni), as technically measurable impurities the already mentioned impurities discussed with respect to the description of the spray powder, this means, up to approximately 0.5% by weight Fe impurities and/or at most the following impurities summarized in the following using the abbreviation TAO: Na, Mg, Al, Si, K, Ca, Ti, V, Mn, Co, Cu, Zn, Ge, Rb, Sr, Y, Zr, Nb, Mo, Rh, Pd, Cd, In, Sn, Hf, Ta, Tl, Pb.

In addition to these impurities which are naturally brought about by the corresponding impurities of the spray powder, the thermal spray layer of a substrate in accordance with the invention can also include up to approximately 1% by weight oxygen (O) which can arrive in the spray layer and can be bound there during the spray process, for example, by oxidation of one or more of the impurities of the spray powder, or in a different way. In particular the oxygen content can lie between 0.1% and 0.5%, and/or between 0.5% to 1% by weight.

Depending on which spray method is selected for the generation of the spray layer in accordance with the invention also further marginal impurities can arrive in the spray layer by the spray process itself. Thus, it is, for example, possible, on the use of HVOF method, in which, for example, kerosene or a different organic or inorganic fuel is combusted for the generation of the thermal energy, that additional carbon from the fuel can arrive in the layer in an amount of up to approximately most 0.1% by weight.

The overall portion of TAO impurities in the spray layer in this connection likewise amounts to approximately at most 0.5% by weight such that in a spray layer in accordance with the invention in addition to the technically essential chemical components tungsten carbide (WC), chrome carbide ($Cr_3C_2$) and nickel (Ni) at most approximately a little more than 2% by weight of actually undesired impurities can be included apart from the marginal impurities, namely at most 0.5% by weight Fe and totally at most 0.5% impurities of the group of the elements which were defined above by the abbreviation TAO, as well as at most up to 1% oxygen and possibly additionally up to 0.1% of additional carbon depending on the spray method.

In this connection Fe in practice can be present approximately between 0.05% and 0.5% by weight in the spray layer of a substrate in accordance with the present invention without showing a significant influence on the properties of the layer sprayed in accordance with the invention. As long as a content of Fe impurities is not larger than 0.5% by weight, in particular the required corrosion resistance of the spray layer is reliably ensured. And also the other layer properties, such as e.g. porosity, micro-hardness and macro-hardness or also e.g. the adhesive tensile strength of the spray layer, are practically not influenced by such a small FE contamination and/or a contamination summarized by TAO and also by the oxygen possibly bound during the spray process in the layer or additional carbon.

Cobalt (Co) can in this connection, for example, besides Fe be present with up to 0.5% by weight, in practice up to approximately 0.05%, 0.1% or between 0.1% and almost 0.5% by weight.

It is understood that in the ideal case no such impurities, this means neither Fe nor an element selected from the group TAO nor oxygen, carbon or a different impurity is included in a spray layer in accordance with the invention which, however, is practically barely realizable.

In an embodiment particularly relevant for practice a thermal spray layer is manufactured in a high velocity flame spray method (HVOF, High Velocity Oxygen Fuel), wherein, however, in principle, also any other type of known thermal spray method can advantageously be used, such as a different flame spray method, cold gas spraying, plasma spraying or a different thermal spray method.

In this connection the spray layer in accordance with the invention has a significantly improved micro-hardness in comparison to the state of the art which micro-hardness, in particular e.g. is higher by about 50 HV 0.3 than other known spray layers known from the state of the art which, for example, are known for brake discs. This means that the micro-hardness of a thermal spray layer in accordance with the present invention lies in the range of 1000 to 1200 HV 0.3, preferably between 1100 and 1200 HV 0.3, in particular at 1160 HV 0.3.

Also the micro-hardness of spray layers in accordance with the invention is significantly better than that of the known layers and can e.g. lie by at least 1 to 2 units (macro-hardness scale HR 15N) higher, such that a macro-hardness of a thermal spray layer of the invention preferably lies in the range of 90 to 93 HR 15 N.

Moreover, also an adhesive tensile strength of the thermal spray layer in accordance with the invention can be significantly improved and particularly preferably lies in the range of 65 MPa to 75 MPa and thereby lies at least 5 MPa higher than the adhesive tensile strength of corresponding spray layers known from the state of the art.

A porosity of the thermal spray layer in accordance with the present inven-tion advantageously lies in the range of 0.5% to 1.5% volume percent, preferably at 1% volume percent, such that the porosity with respect to known spray layers is reduced by at least 1% volume percent, this means in comparison to the state of the art is reduced by approximately a half.

The spray layers in accordance with the invention are also characterized, besides the already mentioned improvements, in particular by less defects, such that the spray layers in accordance with the invention have a very much smaller susceptibility with respect to under corrosion, a significantly increased ductility and in comparison to known spray layers a much smaller risk for the formation of cracks in the layer.

In conclusion all this finally leads to the fact that a further post-treatment which is compulsory necessary, as is known in the state of the art e.g. in accordance with DE 10 2009 008 114 A1, can be completely omitted for layers in accordance with the invention.

The invention finally relates to a method for the manufacture of a thermal spray layer at a substrate including the following method steps: provision of a spray powder in accordance with the invention in accordance with the previous description. Provision of a substrate, in particular a brake disc blank for a vehicle. Coating of the substrate by means of a thermal spray method, preferably by means of an HVOF method on use of a spray powder in accordance with the invention. In this connection the process parameters on thermal spraying are selected such that a deposition efficiency at the substrate is achieved in the range of 60% to 65%, preferably between 50% and 55% during the method in accordance with the invention.

The invention claimed is:

1. A spray powder on a tungsten carbide basis for the thermal coating of a substrate, said spray powder, apart from impurities, comprising:
    WC in the range of 60% to 75% by weight, $Cr_3C_2$ in the range 14% to 22% by weight, Ni in the range of 11% to 23% by weight, and a maximum amount of Fe and of technically measurable impurities of 0.5% by weight,
    wherein a standard particle size of a primary carbide of WC lies in the range of 0.5 µm to 2 µm.

2. A spray powder in accordance with claim 1, wherein the portion of WC in the spray powder lies in the range of 63% to 70% by weight.

3. A spray powder in accordance with claim 1, wherein the portion of $Cr_3C_2$ in the spray powder lies in the range of 17% to 19% by weight.

4. A spray powder in accordance with claim 1, wherein the portion of Ni in the spray powder lies in the range of 13% to 20% by weight.

5. A spray powder in accordance with claim 1, wherein a nominal particle size of the spray powder lies in the range of 45 µm to +11 µm.

6. A spray powder in accordance with claim 1, wherein the portion of WC in the spray powder is 67% by weight.

7. A spray powder in accordance with claim 1, wherein the portion of $Cr_3C_2$ in the spray powder is 18% by weight.

8. A spray powder in accordance with claim 1, wherein the portion of Ni in the spray powder is 15% by weight.

9. A spray powder in accordance with claim 1, wherein a nominal particle size of the spray powder lies in the range of -45 µm to +20 µm.

10. A method for the manufacture of a spray powder in accordance with claim 1, comprising:
    provision of WC, $Cr_3C_2$ and Ni and manufacture of a powder mixture, which is composed of, apart from impurities, WC in the range of 60% to 75% by weight, $Cr_3C_2$ in the range of 14% to 22% by weight, Ni in the range of 11% to 23% by weight, a maximum amount of Fe and of technically measurable impurities of 0.5% by weight and a standard particle size of a primary carbide of WC lies in the range of 0.5 µm to 2 µm.
    manufacturing a suspension including the powder mixture, a solvent and an additive and homogenization of the suspension;
    manufacturing a powder cake, in particular agglomerates, by spray drying of the suspension;
    sintering the powder cake;
    breaking and/or grinding the sintered powder cake to a powder material;
    provision of the spray powder through selecting a predefined seed size distribution via a classification method.

11. A method in accordance with claim 10, wherein the solvent is isohexane and the additive is a binder and/or an antifoaming agent.

12. A spray powder on a tungsten carbide basis for the thermal coating of a brake disc, said spray powder comprising a powder mixture having:
    a nominal particle size larger than 11 µm and smaller than 45 µm;
    a maximum amount of Fe and of technically measurable impurities of 0.5% by weight;

a composition of only WC in the range of 60% to 75% by weight, $Cr_3C_2$ in the range of 14% to 22% by weight, and Ni in the range of 11% to 23% by weight; and said powder mixture being made from a starting material comprising WC having a standard particle size in the range of 0.5 μm to 2 μm.

\* \* \* \* \*